Feb. 22, 1955        F. OSBORNE        2,702,407
METHOD AND APPARATUS FOR MAKING LIGHTWEIGHT SLAGS
Filed Nov. 6, 1951        2 Sheets-Sheet 1
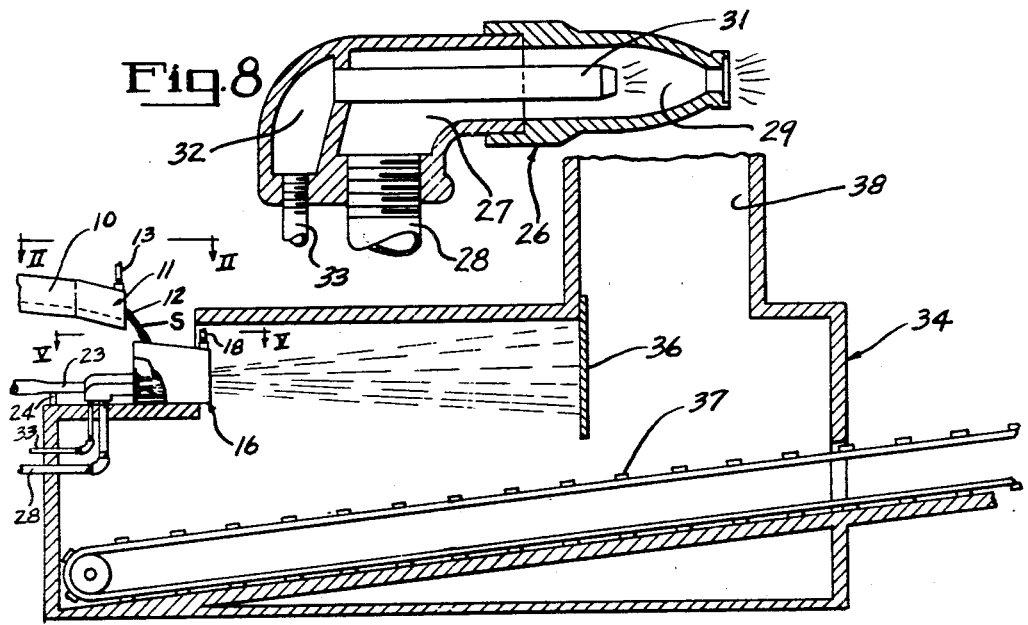
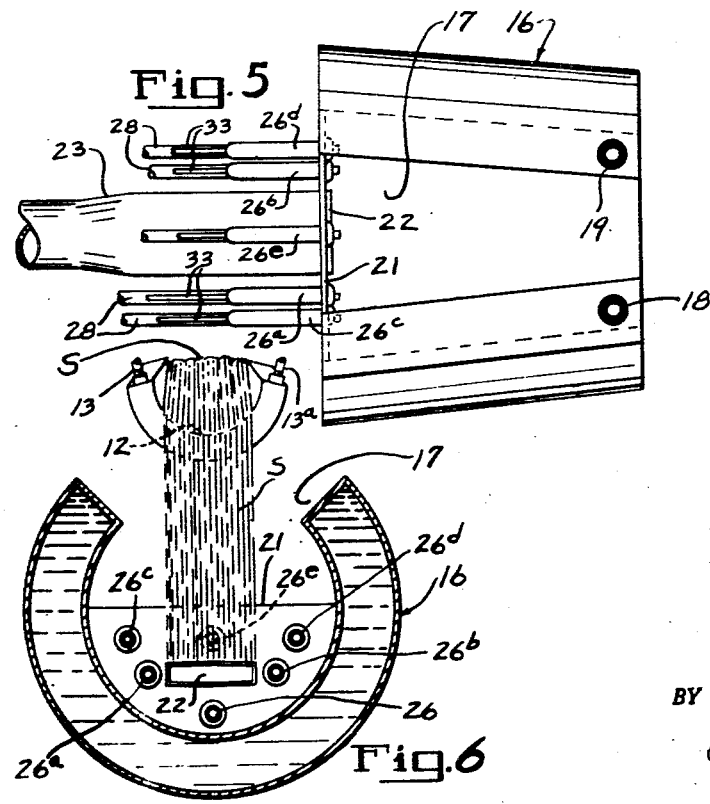
INVENTOR.
FRED OSBORNE
BY Jennings & Carter
ATTORNEYS

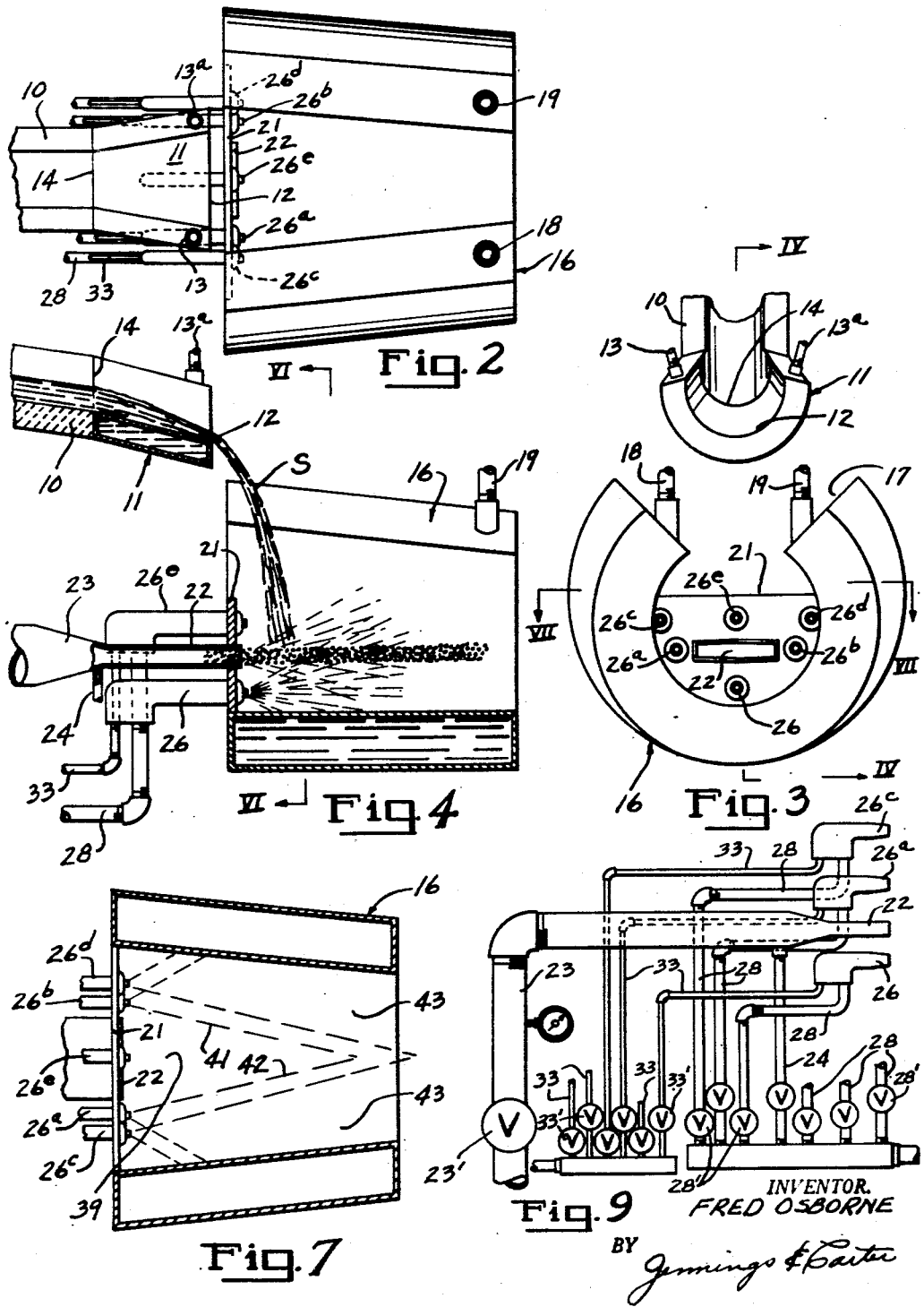

---

United States Patent Office 2,702,407
Patented Feb. 22, 1955

---

2,702,407

METHOD AND APPARATUS FOR MAKING LIGHTWEIGHT SLAGS

Fred Osborne, Birmingham, Ala.

Application November 6, 1951, Serial No. 255,029

13 Claims. (Cl. 18—2.5)

The present application is a continuation-in-part of my now abandoned application Serial No. 896, filed January 7, 1948, subject "Method and Apparatus for Making Light Weight Slag."

This invention relates to a method of and apparatus for producing light weight slag, and more particularly to a method of making slag suitable for use as aggregate in the production of building blocks and light weight concrete, that is, cellular or expanded slag having high crushing strength and a density in loose state of approximately one-fourth that of blast furnace slag in the molten state.

Slag from blast furnaces and other metallurgical operations is in most cases a waste product which furnace operators must pay to have removed or dumped, introducing an element of cost into the metal and its ultimate products. It has long been recognized that if a high velocity jet of dry gas, as for example super-heated steam, is directed against a pencil-like stream of molten slag, the slag will be attenuated and formed into fibers, producing what is sold commercially as rock wool. A small proportion of the slag is not converted into fibers, but forms tiny glass-like beads or pellets which are removed. To aid in causing the rock wool to mat and have resilience, a resin is sprayed onto the fibers as they are produced.

In the case of most metallurgical furnaces, this operation cannot be carried out at the full rate at which the slag is produced, so that only a part of the run-off of slag from a furnace is utilized, and the slag which is so used must be transported from the furnace to the rock wool plant.

In other operations the molten slag is run into pits where it is air-cooled and solidified as a dense rock-like mass which is subsequently broken up for use as railway ballast, road construction, and even for concrete aggregate, but it is much too heavy for satisfactory use as aggregate in concrete building blocks, or light weight concrete construction.

Much of the slag produced is simply run off into a pit or trough containing water. In this case the slag is granulated or expanded into a mass which is easily broken in the fingers, and most of it is very fine and less suitable for use in concrete than sand. It is sometimes screened to eliminate lumps, and mixed with lime to form a substance somewhat like mortar.

Various attempts have been made, and much expensive investigation done in an effort to produce an expanded slag having both the desired porosity and crushing strength, so that it has lightness of weight, desirable thermal insulation and crushing strength to adapt it for use as aggregate in concrete, especially concrete blocks. The most successful results prior to my invention have been obtained through the use of expensive machines in which the slag is poured onto rotating fan-like blades while being sprayed with water. Aside from the initial investment involved with such equipment and the cost of maintaining it, such equipment results in products of erratic quality, much of which is referred to as "pop-corn," being too soft and friable, and much of which is not salable by reason of its non-uniform quality.

It is the contact of water with the slag in a molten condition that effects the expansion or porosity of the slag. In the rock wool process above described, the wool fibers are instantaneously formed at the point of impingement of the dry gas against the slag, and while water sprays or resin emulsion sprays may be located in the path of the fibers, the fibers are too cool a short distance from the nozzle for the water to have any effect on the quality or character of the fibers. Where water is used, it is to aid in matting the fibers and reducing dust (or reducing fire hazard if hydrocarbons are also applied to the fibers).

On the other hand, a quantity of water applied too suddenly to the slag results in "pop-corn" or puffy, friable material. This is easily demonstrated by pouring molten slag onto a wet concrete surface where it simply puffs up into an easily powdered mass.

According to the present invention a method is provided in which no moving equipment is necessary for expanding the slag, and slag of a highly uniform quality, eminently suitable for aggregate in concrete blocks, is produced. In my method I follow the practice of impinging a stream of gas, preferably saturated steam, against a free-falling or cascading stream of slag, the stream of slag being of an order many times that used in making mineral wool, and which may even correspond to the rate of run-off from the monkey hole of a blast furnace. This is of particular importance since the equipment may be located adjacent the furnace, and a single unit can handle, without delay, substantially the entire normal slag production of a medium-size furnace. The velocity of the impinging gas disrupts the continuity of the stream of slag which is driven horizontally forward in compact globules and masses ranging in size from small particles to globules perhaps the size of walnuts, but the velocity of the blast is not of an order such as that used in making mineral wool. These masses or bodies of molten slag, being thus projected by the gas into space, are carried while still molten or while still hot, into a very fine spray or mist of water, this mist being generated by atomizing nozzles using air under pressure, and the jets of spray from these nozzles travel in the same general direction as the slag masses. Thus each slag mass is contacted progressively by innumerable tiny droplets of water instead of encountering sufficient spray to instantly quench it. The initial gas spray appears to have little effect on the physical structure of the slag, other than some cooling, but it serves to project the slag into space as small masses, whereas the fine spray effects the expansion of these masses progressively. Ultimately the material falls into a collecting pit, and much of the slag, though expanded, will have sufficient heat to fuse with other similar masses, so that subsequent crushing may be necessary. That such fusion may take place indicates insufficient contact with a mass of water to produce "pop-corn" which is characteristically present when slag is quenched by sudden contact with water sufficient to instantly chill it.

My process of first using a gas spray to break up the falling stream of slag, followed by contacting the resulting compact molten or white hot masses with atomized water to expand it, produces a good quality aggregate economically, and as above indicated, slag may be processed in its normal flow from the blast furnace monkey hole so that no intermediate handling of the molten slag is necessary.

In the light of the foregoing general explanation, the prime object of my invention is to provide a method of converting furnace slag into light, strong, but light-weight aggregate of commercially uniform quality, by first breaking a falling stream of slag with a blast of gas and impelling the discrete, chunky masses and globules of slag in a still molten or white hot state through a spray of water to expand the slag.

Another object of my invention is to provide a method of the character designated, which comprises cascading a stream of molten slag at a temperature of around 2700° F. over a pouring lip, disrupting the freely falling stream of slag by striking it with a continuous jet of steam flowing at the rate of from one-half to one pound of steam per pound of molten slag, and at a velocity sufficient to disintegrate the slag into molten particles, and immediately passing said molten particles into a contact zone into which there is flowing finely divided water in the amount of 150 to 200 gallons per minute.

Another object is to provide a method of making slag of the kind indicated which comprises cascading a stream of molten slag downwardly in front of a steam nozzle having a generally rectangular shaped opening therein, the long dimension of the opening equalling substantially the width of the falling slag stream and being disposed substantially horizontal, supplying the nozzle with steam under a pressure of approximately ten to forty pounds per square inch, and in volume sufficient to contact the falling stream with steam in the ratio of one-half to one pound of steam per pound of molten slag, whereby the stream is disintegrated into molten particles without forming fibers and then in contacting the particles with sufficient water in finely divided state to cause the same to expand to the extent that the density thereof in its loose condition is reduced approximately to one-fourth the density of the slag while in the molten state.

My invention further contemplates the method of producing light weight expanded slag of high crushing strength, which includes the steps of passing a freely flowing cascading stream into a disintegrating zone within which is directed a high velocity large volume stream of gas, preferably steam, effective to break the slag into a multitude of small, generally spherical shaped molten pellets, adjacent which zone there is maintained a pellet expansion zone in the form of finely divided water sprays, the ratio of such water to the slag pellets being proportioned to expand the slag only to the degree required to reduce its density to approximately one-fourth the density of the molten slag.

A further object of my invention is to provide apparatus of relatively simple and cheap construction in which there is a pouring lip over which the slag cascades with an opening for a blast of steam or other gas located under the lip for blowing horizontally against the cascading slag. Atomizing jets are provided back of the falling slag and arranged to have their jets converge a predetermined distance in front of the stream so that the slag is blown by the blast of steam or gas forwardly into the zone where the sprays converge, assuring the separation of the stream into masses or pellets before contact with the water, or at least most of it. This arrangement also protects the nozzles and prevents any build-up of slag in the apparatus where the operation is being effected.

Further and more general objects of my invention are to provide a process for continuously producing light weight cellular slag; a process which is economical in operation and one which may be used to produce light weight slag under the normally changing conditions of temperature and quality of molten slag as the same comes from the blast furnace.

A suitable form of apparatus for carrying out my invention is illustrated in the accompanying drawings forming a part of this application in which:

Fig. 1 is a transverse sectional view, certain parts being broken away for the sake of clarity, and showing the apparatus associated with a product chamber and conveying means therefor;

Fig. 2 is an enlarged plan view looking in the direction of the arrows II—II of Fig. 1;

Fig. 3 is an enlarged end elevational view of the pouring and disintegrating apparatus shown in Fig. 1;

Fig. 4 is an enlarged sectional view taken generally along line IV—IV of Fig. 3 and showing a stream of slag falling into disintegrating position with respect to the steam nozzle and with certain of the water sprays in operation;

Fig. 5 is an enlarged plan view of the disintegrating and water nozzle mechanism looking in the direction of the arrows V—V of Fig. 1;

Fig. 6 is a detail sectional view taken generally along line VI—VI of Fig. 4;

Fig. 7 is a detail sectional view taken generally along line VII—VII of Fig. 3 and showing the pattern of the water sprays of some of the nozzles when ejecting atomized water;

Fig. 8 is a transverse sectional view through a suitable form of water atomizing nozzle; and Fig. 9 is a schematic view illustrating diagrammatically a piping system by which an operator at a central station, watching the operation, can adjust the discharge from the several nozzles to get just the right operating condition.

Referring now to the drawings for a better understanding of my invention, I show a downwardly directed trough 10 into the upper end of which is placed a stream of molten slag from a blast furnace, not shown. At the lower end of the trough 10 I provide a generally semi-cylindrical member 11, the lower end of which provides a pouring lip 12 for the stream of molten slag. As shown in the drawings, the member 11 may be water-cooled, cooling water entering through a pipe 13 and discharging through a pipe 13a. Also, the member 11 preferably increases in diameter from its upper end 14 to the pouring lip end 12.

Beneath the member 11 is a trough-like member 16 provided with a longitudinally extending opening 17 along its top. The member 16 may be somewhat frusto-conical with the large diameter or rear end disposed so as to receive the falling stream of molten slag through the top opening 17 thereof. The member 16 may be in the form of a hollow casting or the like, and cooling water may be admitted through a pipe 18 and discharged therefrom through a pipe 19.

At the rear end of the member 16 is a generally vertically disposed plate 21 for supporting a plurality of nozzles as will now be explained. Projecting through the plate 21, directly to the rear of the falling slag stream, is a nozzle 22 for gas under pressure, such as steam or air. It will be noted that the nozzle 22 is of considerable cross sectional area, and that the same is disposed so that the long dimension thereof is in a horizontal plane. Likewise, the long dimension of the nozzle 22 equals substantially the width of the falling stream of molten slag as will appear from an inspection of Fig. 6. Steam or other gas under pressure is admitted to the nozzle 22 through a pipe 23 from a source, not shown. Likewise, there may be connected to the nozzle 22 a water pipe 24 for admitting thereto a controlled amount of water for a purpose presently to appear.

Beneath the nozzle 22 is a nozzle 26 from which is ejected atomized water. As best shown in Fig. 8, the nozzle 26 may comprise a chamber 27 to which water is admitted through a pipe 28. The forward end of the nozzle is provided with a mixing or atomizing chamber 29 into which air or other gas under pressure is blown from a pipe 31. The pipe 31 connects at its rear end to a chamber 32 to which air under pressure is supplied through a pipe 33. The type of nozzle under consideration is a well known piece of equipment and may be purchased in the open market. Suffice it to say, therefore, that the nozzle 26 is of a type to deliver water in finely atomized state, and is so arranged as to discharge such atomized water in a definite pattern.

At each end of the large nozzle 22 are nozzles 26a and 26b, similar in all respects to the nozzle 26 and likewise supported from the plate 21. Slightly above the nozzles 26a and 26b are nozzles 26c and 26d, identical with nozzle 26. Immediately above the nozzle 22, located approximately at the longitudinal center of the long dimension thereof, is a sixth nozzle 26e, also identical with the nozzle 26. All of the nozzles just described have water pipes 28 and air pipes 33 connected thereto through which water and air are supplied from suitable sources, not shown in the drawings. Also, each of the pipes 28 and 33 for each of the nozzles is under control of valves, as shown schematically in Fig. 9, where the water valves are marked 28', the steam valves 33', and the steam supply valve to 22 is marked 23'. Fig. 9 does not show all of the nozzles, but the others are valved in the same way, all valves being located at a main control station so the operator in charge can easily adjust each valve to secure the desired condition.

The apparatus so far described may be placed at an end of a final product chamber indicated generally by the numeral 34. The nozzle 22 is disposed to direct the expanded slag toward a baffle plate 36 in the chamber 34, whereby the same falls onto a conveyor means 37 therein for removal from the chamber. The chamber may be provided with a vent stack 38 to permit the escape of steam and water vapor resulting from the process.

From the foregoing, my improved method of making light weight slag may now be explained and understood. With the molten stream of slag S flowing down the trough over the lip 12, steam is admitted through pipe 23 to nozzle 22. Water and air are supplied to the nozzles 26, 26a, 26b, 26c and 26d through the respective pipes 28 and 33 connected to each of the same. The pressure of the steam in the nozzle 22 is so regulated that the cascading stream of slag S is broken up into a multitude of molten pellets. These pellets are passed through the atomized water sprays provided by the water nozzles and expand the slag, completing the formation of the product desired.

By reference to Fig. 7 of the drawing it will be seen that the nozzles 26 to 26d, inclusive, are such as to spray atomized water into the member 16 in the patterns indicated by the dotted lines. Thus, in the zone 39, that is, between the dotted lines 41 and 42, there is no water present unless nozzle 26e is employed. However, immediately to the rear and at the sides of zone 39 is a zone 43 within which is maintained a supply of atomized water. As the slag is disintegrated in zone 39 by the action of the steam issuing from nozzle 22, the particles, still in molten state, pass through the zone 43. It is in the zone 43 that the expansion actually takes place. Thus, by the time the particles leave the inner end of member 16, the quality of the product is set.

In order that it may be more fully and definitely understood, I set out below an example of a process which I have used in making slag of the character indicated herein. Using as a beginning product ordinary blast furnace slag having a temperature typically ranging between 2500° and 2800° F., I pass into trough 10 a stream of slag flowing at the rate of approximately 1000 pounds per minute. The distance from the pouring lip 12 of the water-cooled member 11 to the center of the nozzle 22 in the instance cited was approximately 24 inches. With this quantity of molten slag cascading downwardly as shown in the drawings, I supply sufficient steam to the nozzle 22 to subject the falling stream of slag to the distintegrating action of approximately one-half to one pound of steam per pound of slag falling in front of the nozzle 22. With a nozzle 22 having a cross-sectional area of approximately 15 square inches, I have found that saturated steam under pressure of from 10 to 40 pounds per square inch (240° to 287° F.) is adequate to cause the distintegration required in the zone 39. With the slag being disintegrated by the transversely directed steam, I supply sufficient water and air to the nozzles 26 to 26d, inclusive, to strike the outwardly moving molten pellets, with water at the rate of 150 to 200 gallons per minute. Under some conditions, that is, when I wish to make slag of less density than usual, I may introduce a small amount of water into the nozzle 22 through the pipe 24. Thus, if the chemical or physical characteristics are such that the slag is unusually viscous, I may add from ten to twenty-five gallons of water per minute to the nozzle 22 through the pipe 24. It will be understood that nozzle 22 is of the type to completely atomize water introduced thereinto. Under some conditions when the slag is unusually viscous, I may employ the upper nozzle 26e and supply from 25 to 35 gallons of water per minute in atomized form from this nozzle and direct it onto the slag stream. Offhand it would seem that this water would have a deleterious effect upon the slag, in that it would appear to over expand the same prior to being disintegrated. The fact appears to be that this quantity of water is so slight as compared to that which would be required to materially affect the total expansion of the non-disintegrated stream that the true effect is merely a partial expansion and a slight cooling of the stream. In other words, the amount of water introduced through the nozzle 26e that strikes the falling stream S before it is disintegrated by the nozzle 22 serves only to partially expand the slag and lower the temperature thereof. As stated, I employ this nozzle only under certain specialized conditions, that is, when for any reason the slag is unusually viscous. It will also be noticed that the water introduced through the pipe 24 into the nozzle 22 is relatively low in volume and is insufficient to do little more than simply lower the temperature of the body of slag as a whole and effect slight expansion. With respect to the air supply for the atomizing nozzles, I have found that air supplied through the pipes 33 under a pressure of from 60 to 100 pounds is adequate to cause the nozzles to develop the desired water pattern.

From the foregoing it will be apparent that my process is entirely different from the process of forming molten slag into rock wool. In the latter process, a stream of slag less than one inch in diameter is fed downwardly over a nozzle having a very narrow slit therein, usually vertically arranged, through which slit is blown high pressure steam only, under a pressure of about 80 pounds per square inch upward. The velocity of such a jet of steam is very high and the ratio between the volume of slag acted upon and the volume of steam acting on the same is considerably higher than I employ in my process. In actual operation I have found that my invention is entirely practical in the making of high crushing strength expanded slag. I have further found that the size of the particles made with my improved process is very uniform and that very little dust size particles are obtained. It will also be noted that through the introduction of water into the steam nozzle and the controlled use of the nozzle 26e, together with the individually controlled air, steam and water supplies on all nozzles, I am enabled to maintain a good control over the operating conditions while carrying out my improved method.

The average specific gravity of molten slag is about 2.75, weighing about 172 pounds per cubic foot. The product produced by my method weighs an average of about 40 pounds per cubic foot in the loose state, or, has a density of about one-fourth that of molten slag. In actual test, slag blocks of standard size using my slag have produced blocks of a crushing strength equal to blocks having a denser slag. The expanded slag may be used not only in blocks, but in light weight concrete building structures and roofs where more expensive mineral aggregate is now employed.

While I have shown my invention in but one form, it will be obvious to those skilled in the art that it is not so limited, but is susceptible of various changes and modifications without departing from the spirit thereof, and I desire therefore that only such limitations shall be placed thereupon as are specifically set forth in the appended claims. Also, while I have made specific reference to blast furnace slag, my invention is applicable to other metallurgical slag produced in sufficient quantities and in localities where aggregate of this character is needed.

What I claim is:

1. Apparatus for converting molten furnace slag into cellulated high strength aggregate, comprising means for discharging the molten slag in a cascading stream, a slag cellulating trough-like chamber having an opening at one side thereof to receive molten slag and an opening adjacent an opposite side thereof to discharge the cellulated slag; a gas discharge nozzle disposed in a plane behind the cascading slag stream and in alignment with the cellulated slag discharge opening of the chamber for projecting a jet of gas serving to disrupt the continuity of said stream and to horizontally project the components thereof through the discharge opening as small compact molten masses, means for supplying a gas to such nozzle and water discharge nozzles disposed behind the plane of the cascading slag stream and offset laterally relative thereto, said water nozzles so constructed and arranged to project an atomized spray of water forwardly of the falling stream into a zone primarily confined to said chamber and forwardly of the falling stream so as to contact the components of said stream only after operation thereon by the gas from said gas discharge nozzle and hence after such components have been blown into such zone in the form of suspended compact molten masses, and means for supplying water to said water nozzles, the spray from the water nozzles travelling generally in the direction of the thus blown molten masses.

2. Apparatus as in claim 1, wherein a baffle plate is disposed in spaced relation to the cellulating chamber discharge opening for interception of the cellulated slag and a moving conveyor is disposed below the baffle plate for carrying away the cellulated slag deposited by the baffle plate.

3. Apparatus for converting molten furnace slag into lightweight cellular aggregate, comprising a primary trough for receiving the molten slag and having a discharge end, a secondary trough positioned beneath said primary trough and into which the slag is directed in a cascade as a free-falling liquid stream, a primary fluid discharge nozzle disposed below and rearwardly of the discharge end of said primary trough so constructed and arranged to project against the free-flowing stream of slag within the secondary trough a jet of gaseous fluid serving to disrupt the continuity of said stream and to horizontally project the components thereof as compact molten particles, means for supplying gaseous fluid to said nozzle, the orifice of said nozzle having a width substantially equal to that of the stream and thereby serving to direct a blast against the full width of the said stream, and secondary nozzle means offset laterally from the longitudinal axis of the primary nozzle and similarly offset with respect to the falling stream, the discharge extremities of said primary and secondary nozzles lying in substantially the same vertical plane, said secondary nozzles so constructed and arranged to project a spray of water forwardly of the falling stream into a zone primarily confined to said secondary trough and forwardly of the falling stream so as to contact the components of said stream only after operation thereon by the gas from said primary nozzle and hence after such components have been blown into such zone in the form of suspended particles, and means for supplying water to said secondary nozzles, the spray from the secondary nozzles travelling generally in the direction of the thus blown particulate components.

4. Apparatus as claimed in claim 3, wherein the secondary trough is of substantially frusto-conical form as regards its axis coincident with the blast means from said primary nozzle, with its small end forming an open discharge, means providing a chamber into which the discharge end of said secondary trough extends, and means in said chamber for continuously removing therefrom the product issuing from said secondary trough.

5. Apparatus as claimed in claim 3, wherein certain of said secondary nozzles are arranged in horizontal rows with the orifice of said primary nozzle positioned beneath and substantially medially of a row of secondary nozzles.

6. Apparatus as claimed in claim 4, wherein baffle means are positioned in said chamber in a position to intercept the product issuing from the zone adjacent to said nozzles in said secondary trough, whereby the passage of the product in a horizontal path is interrupted and it is caused to descend upon said continuously moving means for removal from said chamber.

7. Apparatus as claimed in claim 3, wherein the elongated orifice portion of the primary nozzle is horizontally disposed.

8. Apparatus as claimed in claim 4, wherein the secondary trough is provided at its rear end with a vertically disposed plate and said primary and secondary nozzles are affixed to and extend through said plate.

9. Apparatus as claimed in claim 4, wherein the orifices of certain of said secondary nozzles are offset vertically of and upon the axis of said primary nozzle.

10. In the treatment of molten slag to obtain a light weight expanded product of high crushing strength the method which comprises the steps of cascading a molten stream of slag downwardly, intercepting the stream by a jet of gaseous fluid causing the stream to break up into small masses without material cooling and to be projected substantially horizontally, engaging the horizontally moving masses by an atomized water spray causing progressive expansion of the horizontally moving masses without completely chilling them below the temperature of fusion between contacting masses, then removing the product from further contact with the spray.

11. In a treatment of molten slag to obtain a hard light weight cellulated product of high crushing strength, the method which comprises the successive steps of cascading a molten stream of slag downwardly, intercepting the stream with a jet of gaseous fluid and breaking up the stream into small molten horizontally moving masses, thereafter engaging the moving molten masses with an atomized water spray causing progressive expansion and cooling of the moving masses, then removing the masses from further contact with the spray before the expanded masses are fully quenched.

12. In the treatment of molten slag to obtain a light weight partially cellulated product of high crushing strength the method which comprises the successive steps of cascading a molten stream of slag downwardly, intercepting the stream with a jet of gaseous fluid breaking up the stream into small substantially molten horizontally moving masses, thereafter engaging the moving molten masses for a portion only of their movement by an atomized water spray causing progressive expansion of the masses, then removing the thus expanded masses from further contact with the water.

13. A method of converting molten blast furnace slag into a hard expanded aggregate which comprises directing a stream of gas against a cascading stream of molten slag at a velocity sufficient to convert the stream into irregular pellets and below the velocity at which the slag is attenuated into threads, projecting the pellets so formed into a mist of water whereby the incandescent pellets are progressively contacted by innumerable atomized droplets of water any one of which is insufficient to explode the slag into a soft body, but which collectively and cumulatively effect an expansion thereof, and immediately thereafter carrying the slag so processed away to remove it from further contact with the water.

References Cited in the file of this patent

UNITED STATES PATENTS

| | | |
|---|---|---|
| 1,650,136 | Koberle | Nov. 22, 1927 |
| 1,894,208 | Girsewald et al. | Jan. 10, 1933 |
| 1,916,402 | Allen | July 4, 1933 |
| 2,126,411 | Powell | Aug. 9, 1938 |
| 2,315,735 | Richardson | Apr. 6, 1943 |
| 2,358,900 | Zettel | Sept. 26, 1944 |
| 2,417,301 | Hayes | Mar. 11, 1947 |
| 2,442,036 | Caldwell | May 25, 1948 |
| 2,450,978 | Meinzer | Oct. 12, 1948 |
| 2,569,779 | Porter | Oct. 2, 1951 |